US011054262B2

(12) United States Patent
Perry

(10) Patent No.: US 11,054,262 B2
(45) Date of Patent: Jul. 6, 2021

(54) METHOD FOR REDUCING IN-TRANSIT NAVIGATIONAL ERRORS

(71) Applicant: STIDD Systems, Inc., Greenport, NY (US)

(72) Inventor: Richard Perry, Southold, NY (US)

(73) Assignee: STIDD Systems, Inc., Greenport, NY (US)

( * ) Notice: Subject to any disclaimer, the term of this patent is extended or adjusted under 35 U.S.C. 154(b) by 231 days.

(21) Appl. No.: 16/372,651

(22) Filed: Apr. 2, 2019

(65) Prior Publication Data

US 2019/0310089 A1 Oct. 10, 2019

Related U.S. Application Data

(60) Provisional application No. 62/652,372, filed on Apr. 4, 2018.

(51) Int. Cl.
  *G01C 21/16* (2006.01)
(52) U.S. Cl.
  CPC .................... *G01C 21/16* (2013.01)
(58) Field of Classification Search
  CPC .... G01C 21/16; G01C 25/005; G01C 21/165; G01C 17/02; G01C 21/206; G01S 19/14; G01S 19/41; G05D 1/027; G05D 1/0278
  See application file for complete search history.

(56) References Cited

U.S. PATENT DOCUMENTS

| 5,632,217 A | 5/1997 | Ford et al. |
| 7,267,068 B2 | 9/2007 | Bradley et al. |
| 7,305,928 B2 | 12/2007 | Bradley et al. |
| 7,805,244 B2 | 9/2010 | Park et al. |
| 9,703,002 B1 | 7/2017 | Olsson et al. |
| 2009/0043504 A1* | 2/2009 | Bandyopadhyay .... G01C 21/16 701/469 |
| 2009/0254294 A1 | 10/2009 | Dutta |
| 2014/0207374 A1* | 7/2014 | Taylor, Jr. ............ G01C 21/206 701/470 |

FOREIGN PATENT DOCUMENTS

| EP | 2 040 037 A2 | 3/2009 |
| EP | 2 388 552 B1 | 2/2013 |
| WO | WO 2007/142537 A2 | 12/2007 |
| WO | WO 2017/136955 A1 | 8/2017 |

* cited by examiner

*Primary Examiner* — Marthe Y Marc-Coleman
(74) *Attorney, Agent, or Firm* — Ladas & Parry LLP

(57) ABSTRACT

A method for improving the accuracy of an inertial navigation system (INS) by performing a synchronization procedure to align the INS to a compass-derived initial heading comprises the steps of determining a heading of minimal error for the compass and defining that heading as the initial heading; orienting the INS to align with the so-defined initial heading; synchronizing the internal navigation system to that heading; and proceeding with navigation by use of the INS. The INS may be vehicle mounted or be contained in a portable navigation unit for swimmers or other users. The heading of minimal error may be determined by placing the compass within a multi-axis Helmholz coil system and monitoring compass readings and deviation errors as a function of actual compass positions.

3 Claims, 1 Drawing Sheet

Example of Compass Error vs. Heading

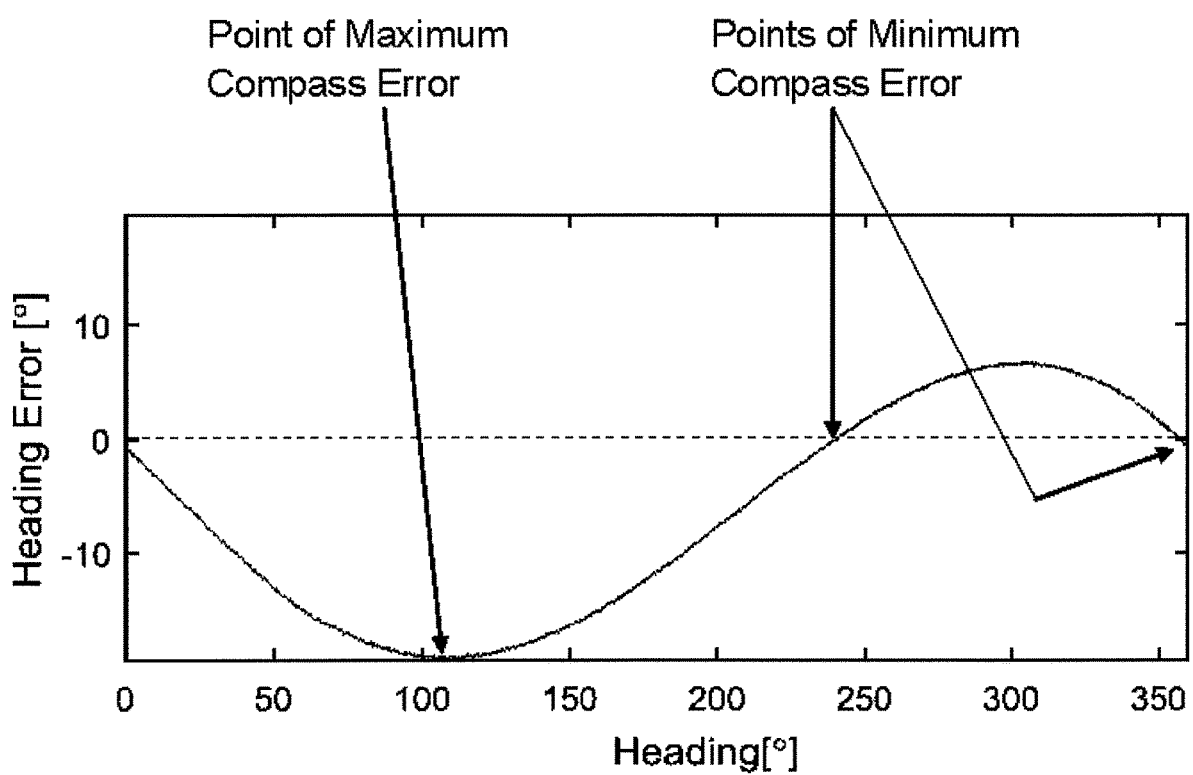
Example of Compass Error vs. Heading

METHOD FOR REDUCING IN-TRANSIT NAVIGATIONAL ERRORS

The present invention relates to vehicle navigation equipment, and more particularly to navigation equipment of the type typically found on manned and autonomous submersible watercraft.

BACKGROUND OF THE INVENTION

Modern vehicle navigation systems often rely on the high-accuracy location data provided by the worldwide Global Positioning System (GPS), which employs a series of satellites whose positions are known with extremely high accuracy. Position and time information received from three or more satellites "visible" to the vehicle are processed by a receiver in the vehicle to determine, with high accuracy, the vehicle's geographic position.

When the vehicle remains able to receive GPS signals, the continuing stream of data allows the position of the vehicle to be continuously compared to its intended course and any deviations therefrom to be corrected.

Certain vehicles, such as submersible watercraft, are unable to continuously rely on GPS data, as when they are submerged satellite data reception is unavailable. Such vehicles typically rely on inertial navigation systems (INS) for maintaining navigation position accuracy in absence of GPS signals. Utilizing the vehicle's known initial location (which may be determined from GPS signals) and heading at that time, typically obtained from a compass reading, an INS applies algorithms to the outputs of motion sensors monitoring the vehicle's velocity and acceleration in three dimensions. The INS algorithms compute an estimate of the vehicle's then-current position (actually determined as a computed deviation from its initial position) on an on-going basis. The estimated computed position information can be displayed for use by the vehicle's navigator. When the INS system is provided with geographic destination location information, in the form of latitude and longitude coordinates, the INS system can itself provide steering queue outputs to the vehicle's navigator or automated steering systems to maintain the vehicle on a proper course without the need for a constant GPS signal.

Modern compasses, while highly accurate, always experience some degree of error, dependent upon the latitude in the world and/or external hard magnetic interferences. Depending on the accuracy of the compass and its indicated direction of vehicle orientation when the data is entered into an INS system, course error can increase with travelled distance. When independent location data, such as obtained from GPS reception, is unavailable for comparison and correction purposes during travel, the course error due to compass error can be significant. This is of particular concern in submersible watercraft, where underwater travel, without GPS access, may be for extended periods.

The present invention is directed to a method by which such compass error can be minimized, particularly in situations in which corrective position data is or will be unavailable. The method is applicable upon initial start of travel, as well as periodically during travel to compensate for accrued heading error due the inaccuracies of the other inertial guidance sensors. The methodology does not change the inherent accuracy of the compass, but allows compensation for its inaccuracy.

DESCRIPTION OF THE FIGURE

FIG. 1 is a graphical illustration of a typical compass's error as a function of its displayed compass reading.

DESCRIPTION OF THE INVENTION

Compass manufacturers recognize the existence of heading-related error, and can provide a graph or plot for a particular compass detailing its deviation as a function of indicated heading over a full 360° circumference as installed in its intended environment. This data may be obtained, for example, by placing the compass within a multi-axis Helmholz coil system and monitoring the compass reading as a function of actual compass position with respect to the known orientation of the magnetic field generated by the coil system to obtain deviation values for various compass readings. With a sufficient number of values a graph can be generated over a full 360 degree circumference. While this error has been found to be a function of the specific latitude where the compass is located, it is possible to provide a plot which normalizes the error over a latitude range. FIG. 1 depicts such a graph. FIG. 1 illustrates that, for the compass with which the graph is associated, the compass has a maximum heading of −20 degrees. The illustrated graph indicates that maximum error occurs at about 110 degrees, while minimal error occurs at about 0 and 245 degrees. The present invention is in particular directed to a method in which the accuracy plot for a compass may be utilized to compensate for compass's inherent error and thus improve the navigation performance of inertial guidance systems.

As discussed above, INS systems require an initial entry of its geographical location and its heading or direction of travel relative to true North. Geographical location data is typically GPS-derived, while initial heading information relative to true North is provided by a heading sensor or GPS course data if available. However, when that indicated heading is derived from a compass, it is subject to the inherent compass error. In accordance with the present invention, as part of calibrating the initial conditions of the INS unit, the navigation system is oriented along a compass heading that corresponds to one of the predetermined plot-provided headings of minimal compass error. The inertial guidance system then initiates its navigation computations relative to these initial conditions. Thus the INS initiates its navigation using the most accurate heading data for its position computations and accordingly displays updated geographical positions based on the most accurate initial heading information available. If a desired course or destination is entered into the IG system, the INS system will provide steering data to align the navigation system with the desire endpoint geographical target location, even if the initial heading used to calibrate the initial conditions of the INS is significantly different from the needed direction of travel.

In addition to use in submarine vehicles, the invention has utility in a variety of other situations, such as in aircraft when atmospheric conditions, electromagnetic interference, or other localized conditions prevent GPS reception. It can also be employed with hand-held or otherwise portable INS units, such as those employed by swimmers and divers.

I claim:

1. A method for improving the accuracy of an inertial navigation system (INS) by performing a synchronization procedure to align the INS to a compass-derived initial heading utilizing a previously prepared display of compass error as a function of indicated heading over a 360 degree circumference, comprising the steps of:
- a. utilizing the display of compass error to determine a heading of minimal error for the compass and defining that heading as the initial heading;
- b. orienting the INS to align with the so-defined initial heading;
- c. synchronizing the internal navigation system to that heading; and
- d. proceeding with navigation by use of the INS.

2. The method of claim 1 wherein the INS is associated with a vehicle.

3. The method of claim 1 wherein the display of compass error is formed by placing the compass within a multi-axis Helmholz coil system and monitoring the compass reading as a function of actual compass positions with respect to a known orientation of the magnetic field generated by the coil system and obtaining deviation values for various compass positions.

* * * * *